June 17, 1969  G. J. PAPTZUN  3,450,385
GROOVED VALVE DISC
Filed Feb. 14, 1964
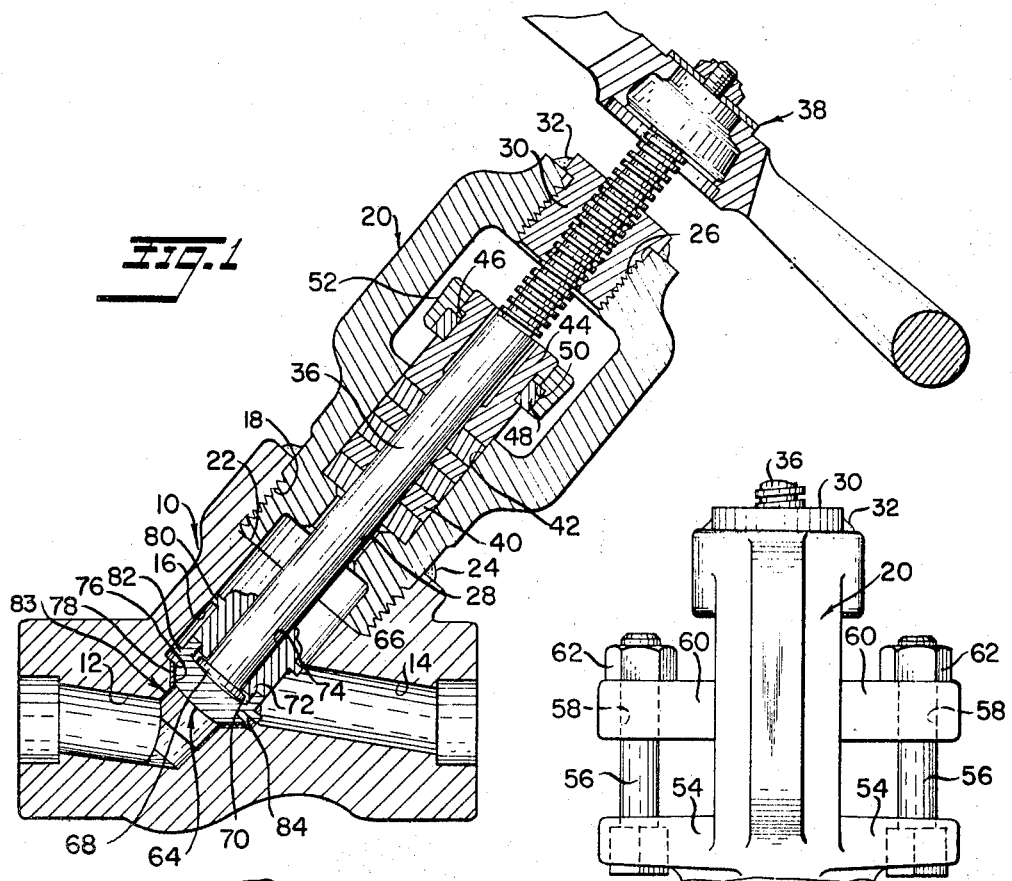
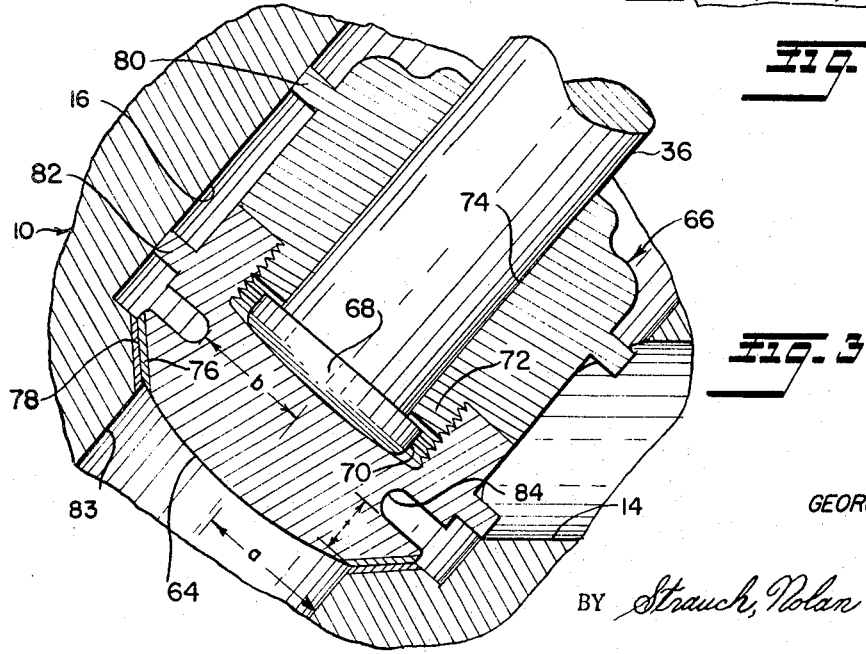
INVENTOR
GEORGE J. PAPTZUN
BY Strauch, Nolan & Neale
ATTORNEYS

United States Patent Office 3,450,385
Patented June 17, 1969

3,450,385
GROOVED VALVE DISC
George J. Paptzun, Griffith, Ind., assignor to Rockwell Manufacturing Company, East Chicago, Ind., a corporation of Pennsylvania
Continuation of application Ser. No. 344,997, Feb. 14, 1964. This application Dec. 12, 1966, Ser. No. 601,220
Int. Cl. F16k *1/00, 5/00*
U.S. Cl. 251—334                        3 Claims

ABSTRACT OF THE DISCLOSURE

A valve in which a frusto-conical seating surface on a stem-mounted closure member is moved into and out of engagement with a similar frusto-conical valve seat, the closure member having a central stiff body portion provided with a peripheral groove adjacent the seating surface to impart flexibility to said body in the region of said seating surface.

---

This application is a continuation of application Ser. No. 344,997, filed Feb. 14, 1964, and now abandoned.

This invention relates to valves and more particularly to novel closure members for high pressure valves.

In valves developed for handling fluids of several thousand p.s.i. it is necessary that the closure member be moved into engagement with the valve seat with very high force which may cause excessive wear or deterioration of the parts. As a practical matter it is not economically feasible to manufacture valves to sufficiently close tolerances to assure that the closure members are so dimensionally related to the valve seat area that the parts engage with uniform pressure over the entire seating area. Often distortion in the valve seat area caused by thermal effects or by mechanical stresses makes it impossible to obtain a high pressure seal.

Even to accommodate the effects of "normal" irregularities in the seating surfaces it is necessary to rely on a very heavy stem loading which necessarily also subjects the valve closure member to high forces. This in turn requires a heavier closure member which because of its increased stiffness may render it even more difficult to effect a tight seal. Other considerations, such as the attainment of the desired flow pattern within the valve, and the prevention of excessive pressure drop across the valve, also dictate a relatively large thick and stiff valve closure member. Thus, a valve disc having the desired mechanical strength and the configuration to produce the optimum flow characteristics is incapable of flexing the amount required to produce a leak proof seal.

With these considerations in mind it is a principal purpose and object of the present invention to provide improved valve closure members which are capable of effecting a leak proof seal while retaining the configuration necessary to sustain the high loads applied to them by the stem and the configuration necessary to achieve optimum flow characteristics in the valve.

It is a further object of the present invention to provide improved closure members which are capable of effecting a leak proof seal while retaining the configuration necessary to sustain the high loads applied to them by the stem and the configuration necessary to achieve optimum flow characteristics in the valve.

It is a further object of the present invention to provide improved closure members in which localized flexibility is achieved in the region of the seat area without sacrifice of the localized rigidity necessary in the area to which the stem loads are applied.

It is another object of the present invention to provide improved valve closure members which will not yield in the region adjacent the stem bearing surface upon application of high seating loads.

In attaining these and other objects the present invention provides closure members having a relatively thick stiff central section to which the stem loads are applied and a relatively flexible seat engaging portion which flexes in a direction parallel to the axis of the seat sufficiently to assure a leak proof seal despite distortion or irregularities in the seat area.

Because of the direction in which the flexibility is achieved, that is, a direction parallel to the axis of the seat area, the flexible section may be made relatively thick and rugged. The need for relatively thin flexible sections which are difficult to manufacture and involve excessive local stresses and which relied on diametral flexibility is eliminated by the present invention.

Additional objects and advantages of the present invention will become apparent as the description proceeds in connection with the accompanying drawings in which:

FIGURE 1 is a view partly in elevation and partly in central vertical section illustrating a typical valve incorporating a closure member of the present invention;

FIGURE 2 is a fragmentary side elevation of the valve of FIGURE 1; and

FIGURE 3 is an enlarged vertical central section of the disc member per se shown removed from the remainder of the structure.

Referring now more particularly to the drawings, the unique valve closures of the present invention may be incorporated in valves with a number of basic configurations including stop valves of the globe and angle type, stop-check valves, check valves and gate valves. For purposes of illustration the invention will be disclosed as applied to a stop valve.

The stop valve shown in FIGURES 1, 2 and 3, except as pointed out in detail below, is of essentially the same construction as the valve disclosed in copending application, Ser. No. 176,201, filed Feb. 28, 1962 for valves, now Patent No. 3,193,247. This valve comprises a one piece body 10 having flow parts 12 and 14 communicating at their inner ends with an internal essentially cylindrical chamber 16. At its upper end chamber 16 is enlarged to provide a threaded counterbore 18 which receives the lower threaded end of the combined yoke-bonnet assembly indicated generally at 20. This assembly is threaded into the counterbore 18 until its lower end abuts against the shoulder 22 and the assembly is held in place by an annular weld 24 which seals the joint.

The yoke assembly has upper and lower coaxial openings 26 and 28, the former being threaded for reception of the yoke bushing 30 tack welded in place as in 32. The upper end of the valve stem 36 is threaded into the yoke bushing 30 and extends through the lower opening 28 into the valve chamber 16. A conventional hand wheel assembly 38 is suitably connected to the upper end of the stem.

Stem packing 40 is compressed in the chamber 42 formed within the yoke assembly by a gland 44 having a recess 46 for the reception for a split ring 48 held in position by a gland flange 52. The yoke assembly is provided with oppositely extending ears 54 apertured to receive a pair of gland bolts 56 which extend upwardly through openings 58 in laterally projecting ears 60 formed integrally with flange 52. Nuts 62 threaded on the upper ends of gland bolts 56 are provided to adjustably compress the packing 40. A valve of this general construction is rated to handle fluids up to 3600 p.s.i. at a 100° F. or 1500 p.s.i. at 1100° F.

As best shown in FIGURE 3, the valve closure member comprises a disc 64 and a disc nut 66 secured together around an integral collar 68 on the lower end of the stem 36. The disc member 64 has a central upwardly opening essentially cup-shaped cavity 70, the bottom of which is slightly concave and the side walls of which are threaded for the reception of a reduced threaded portion 72 of the disc nut 66. The stem 36, disc 64, and disc nut 66 are so dimensioned that when the disc and disc nut are tightly assembled, a substantial clearance is provided around the collar 68 on the bottom of the stem. A slight clearance is also provided between the stem 36 and the bore 74 through which it extends, these clearances thus permitting rotation of the stem with respect to the disc 64 and disc nut 66.

The periphery of the bottom portion of the disc 64 is provided with a hardened seating surface 76 of frusto-conical configuration adapted to sealingly engage the frusto-conical surface 78 formed at the lower end of the chamber 16 in the valve body. The seating surfaces 76 and 78 are preferably of Stellite or similar abrasive resistant material and may be formed by the method disclosed and claimed in Patent 2,903,564.

The disc 64, disc nut 66, and stem 36 are guided for vertical movement in chamber 16 by upper and lower wear and guide rings 80 and 82 which may be formed integrally with the respective parts or may be of hardened material such as Stellite deposited on the parts in accordance with the method shown in the aforesaid United States Letters Patent 2,903,564.

The valve is closed by rotating the handwheel 38 in a direction to move the stem, the disc and the disc nut downwardly until the sealing surfaces 76 and 78 are in tight engagement. During the initial portion of this movement the disc rotates with the stem, the rotation continuing until the sealing surfaces 76 and 78 are in frictional engagement. In the limited continuing closing movement, stem 36 continues to rotate while the movement of the disc is purely axial.

To effect a tight seal under differential pressures of several thousand p.s.i., the closing force developed by the stem against the disc is necessarily very high. As is well known, even slight distortion or irregularities in the seating surfaces may produce small leaks which cause local erosion of the seating surfaces which then rapidly deteriorate. In most cases a tight peripheral seal can be effected only by distortion of the parts which in turn requires high stem loading which can be accommodated only by a disc of substantial strength, thickness and rigidity. Simply employing a heavy, stiff disc to accommodate the high applied forces does not solve the problem since the increased stiffness necessitates the application of even higher loads before the necessary distortion of the parts can be effected to complete the seal.

The present invention overcomes this difficulty by the provision of a disc in which the central section engaged by the bottom of the stem is relatively thick and stiff while the portion of the disc adjacent the sealing surface 76 is relatively flexible. The local flexibility is attained by incorporating a circumferential groove 84 in the disc above the seating surface 76 and below the bottom of the recess 70 which supports the stem loads. This unique construction takes advantage of the fact that the bending moment developed by the stem varies from the maximum at the center of the disc to zero at the disc seating joint. Thus, the thickness at the outer diameter of the disc is largely governed by the shearing stress. The thickness needed to provide adequate shear strength on a large diameter is less than that required on a small diameter. Thus, the groove 84 substantially in the location shown, provides a relatively thin and flexible section adjacent the bottom of the stem.

When the disc 64 incorporating the groove 84 is moved into engagement with the body seating surface 78 the portion of the disc between the seating surface 76 and the groove distorts in a direction generally axially of the stem to accommodate distortion or irregularities in the seating surfaces to provide a drop tight seal without requiring excessive stem loads. The distortion of the valve disc is confined to the region between the root of the groove 84 and the seat joint.

While the size and location of the groove 84 can be varied to some extent, the best results are achieved by observing the following criteria. One of the most important dimensional relationships is that between the radius $a$ of the seat port 83 and the radius $b$ of the base of the groove 84. Actual experience has established that best results are obtained if the radius of the base of the groove 84 is .8 times the radius of the seat port 83. Improved results have also been obtained with groove radii which range from .75 to .92 times the port radius. The thickness of the disc at the radius of the base of the groove is dependent on the allowable stress once the groove radius has been chosen. This thickness $t$ may be expressed by the following formula:

$$t = \sqrt{\frac{3W(a-b)}{S_r \pi b}}$$

where:

$a$ = port radius,
$b$ = groove radius,
$S_r$ = maximum stress allowable at radius $b$,
$t$ = disc thickness at radius $b$,
$W$ = maximum stem load.

For present purposes it may be assumed that W equals 1.1 times the product of the seat area and the maximum rated valve pressure and $b$ equals $.8a$. The width of the groove is not critical since all of the flexing movement takes place in the bottom part of the disc beneath the groove. In practice the groove width is determined by the best size for easy machineability and the provision for an adequate radius to prevent stress concentration.

Actual tests have established that the required stem loads are very substantially reduced by the use of the present invention. For example, in a test case where the seating surfaces of the valve body and the disc were machined to achieve minimum distortion it was found that a stem load of approximately 15,000 lbs. was required to effect a tight seal against a line pressure of 14,040 lbs. The valve body was then artificially distorted to achieve a maximum out of roundness of .007 inch. Under these conditions it was found that when a standard disc was used the required stem loading rose to 37,000 lbs. The required stem load in the valve employing the disc of the present invention was less than 25,000 lbs. This remarkable improvement in performance is achieved without the addition of any moving parts or the utilization of complex configurations and without the loss of any other desired performance characteristics.

What is claimed and desired to be secured by Letters Patent is:

1. A valve comprising a valve body having flow passages intersecting a closure chamber, means forming an annular frusto-conical valve seat at the intersection of one of said passages and said chamber, a valve stem movable in said chamber toward and away from said seat, and a valve disc carried by said stem for movement toward and away from said seat, said disc having a rigid body portion having one one side a bearing surface engageable with said stem, the portion of said body extending from said bearing surface to the opposite side of said disc being stiff and of substantially uniform thickness, said disc having an annular frusto-conical seating surface on the side opposite said bearing surface and radially outwardly thereof and forming an outer peripheral portion of said rigid body portion, said seating surface being adapted to engage said valve seat with annular surface contact when said valve is closed, and means to impart localized flexibility to said body in the region of said seating surface comprising a continuous peripheral groove extending into said body portion in the region between said seating surface and said bearing surface, one side of said groove intersecting the outer periphery of said body portion closely adjacent the outer edge of said seating surface, said groove extending inwardly with its base spaced from the axis of said body portion a radial distance no greater than the radial distance between the inner edge of the seating surface and said body portion axis and permitting limited localized flexing of said body in the region of said seating surface in a direction axially of said valve seat when said disc is brought into tight engagement with said valve seat without decreasing the rigidity of said disc in the central region thereof, whereby the distortion of the valve disc under high seating loads is confined to the region between the base of the groove and the seating surface.

2. The valve according to claim 1 wherein the radius of the base of said groove is not less than .75 times the radius of said one valve passage at said seat.

3. The valve according to claim 1 wherein the radius of the base of said groove is between .75 and .92 times the radius of said one valve pasage at said seat.

References Cited

UNITED STATES PATENTS

| | | | |
|---|---|---|---|
| 1,667,203 | 4/1928 | Harris | 251—88 |
| 177,450 | 5/1876 | Atkinson | 251—264 |
| 1,590,171 | 6/1926 | Spinnler | 251—264 X |
| 1,772,406 | 8/1930 | Whiton | 251—274 X |
| 2,507,851 | 5/1950 | Bryant et al. | 251—361 X |
| 3,054,422 | 9/1962 | Napolitano | 251—334 X |
| 3,174,718 | 3/1965 | Bowen et al. | 251—334 |
| 3,193,247 | 7/1965 | Pool | 251—210 |
| 3,219,311 | 11/1965 | Siver | 251—334 X |

FOREIGN PATENTS

| | | |
|---|---|---|
| 625,110 | 6/1949 | Great Britain. |

ARNOLD ROSENTHAL, *Primary Examiner.*

UNITED STATES PATENT OFFICE
CERTIFICATE OF CORRECTION

Patent No. 3,450,385

June 17, 1969

George J. Paptzun

It is certified that error appears in the above identified patent and that said Letters Patent are hereby corrected as shown below:

Column 2, line 40, "parts" should read -- ports --. Column 4, line 53, "confiigurations" should read -- configurations --; line 64, "one" , first occurrence, should read -- on --.

Signed and sealed this 21st day of April 1970.

(SEAL)
Attest:

Edward M. Fletcher, Jr.

Attesting Officer

WILLIAM E. SCHUYLER, JR.

Commissioner of Patents